United States Patent

Haas et al.

[11] Patent Number: 5,544,570
[45] Date of Patent: Aug. 13, 1996

[54] CONTINUOUS OVEN FOR MAKING BAKED WARE

[75] Inventors: Franz Haas, Vienna; Johann Haas, Klosterneuburg; Engelbert Baum, Österreich, all of Austria

[73] Assignee: Franz Haas Waffelmaschinen Industriegesellschaft m.b.H., Vienna, Austria

[21] Appl. No.: 237,122

[22] Filed: May 3, 1994

[30] Foreign Application Priority Data

May 5, 1993 [AT] Austria ................................. 877/93

[51] Int. Cl.⁶ ................................................ A21B 1/42
[52] U.S. Cl. ................... 99/443 C; 99/474; 99/477; 432/59; 432/72
[58] Field of Search ................. 432/8, 59, 72; 99/443 C, 474, 477

[56] References Cited

U.S. PATENT DOCUMENTS

| | | | |
|---|---|---|---|
| 3,923,449 | 12/1975 | Brock | 432/59 |
| 4,116,620 | 9/1978 | Stibbe | 432/59 |
| 4,140,467 | 2/1979 | Ellison et al. | 432/72 |
| 4,217,090 | 8/1980 | Whike et al. | 432/59 |
| 4,588,378 | 5/1986 | Yamamoto et al. | 432/59 |
| 4,789,332 | 12/1988 | Ramsey et al. | 432/72 |
| 5,077,072 | 12/1991 | Sieradszi | 99/443 C |

FOREIGN PATENT DOCUMENTS

| | | |
|---|---|---|
| 0334001 | 9/1989 | European Pat. Off. . |
| 1532904 | 3/1970 | Germany . |
| 356100 | 9/1961 | Switzerland . |

Primary Examiner—Tony M. Argenbright
Attorney, Agent, or Firm—Collard & Roe, P.C.

[57] ABSTRACT

In a continuous oven for making baked ware comprises a baking belt, which extends through an elongate oven space, and upper and lower radiant heaters, which are flown through by heating gas and are included in a heating gas circulating circuit, which comprises a heat exchanger, which is arranged to be heated by the nesting gases being recycled and serves to neat the air that is to be supplied to the oven space The heat exchanger is included in the heating gas circulating circuit between the radiant heaters and the exhaust gas outlet and in an air circulating circuit provided with a water vapor outlet and a fresh air inlet is disposed between the fresh air inlet and the oven space.

1 Claim, 3 Drawing Sheets

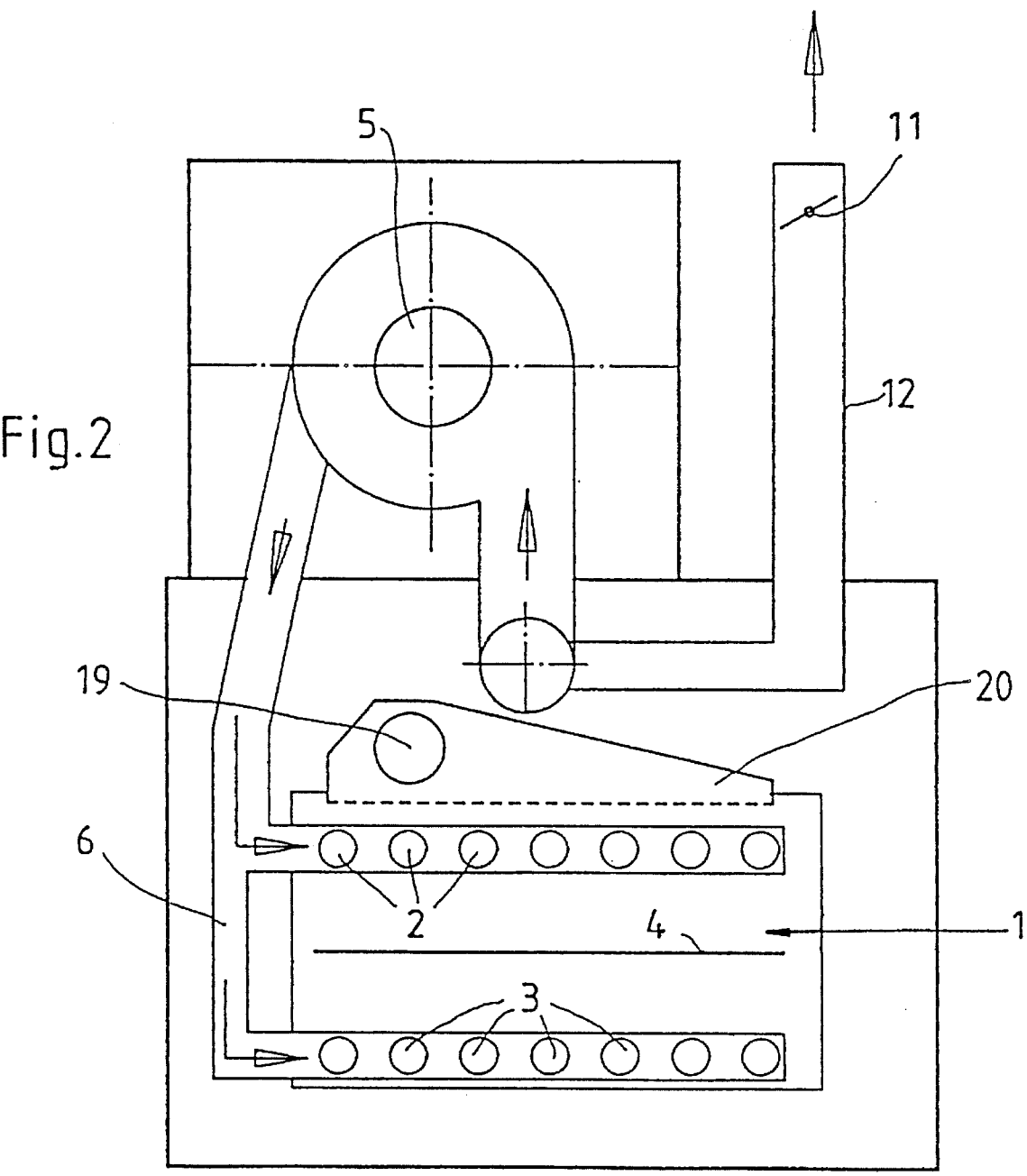

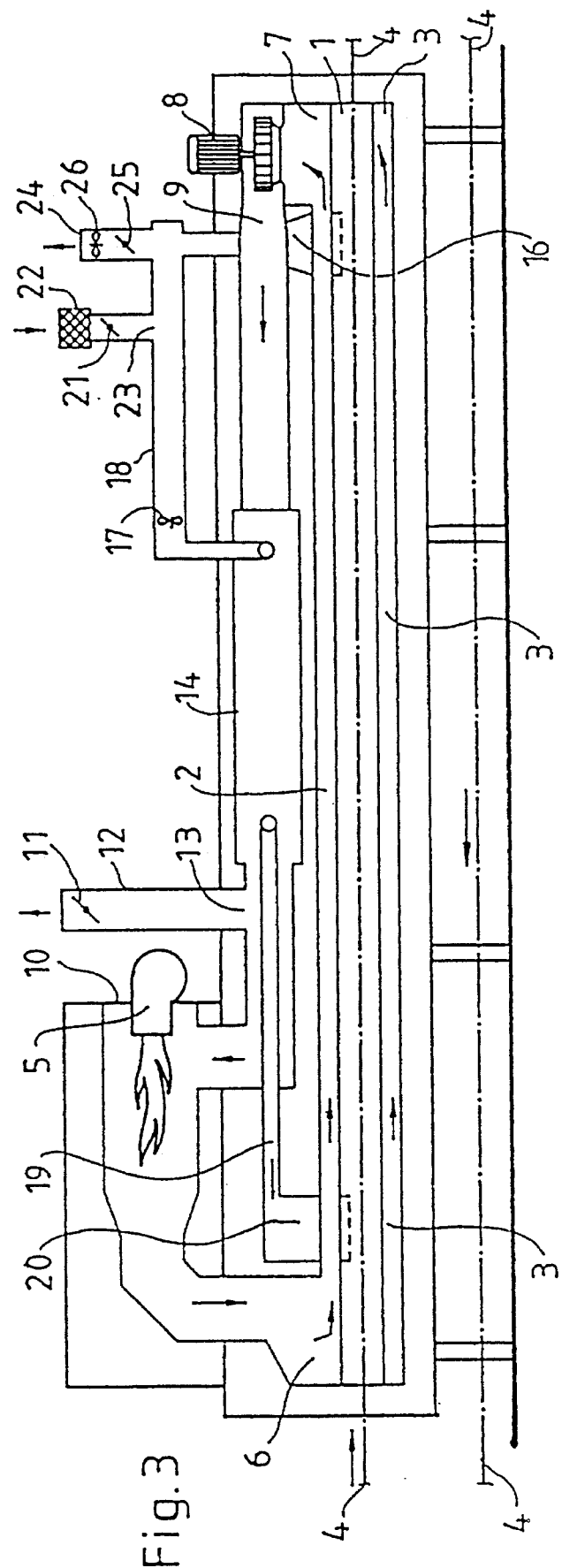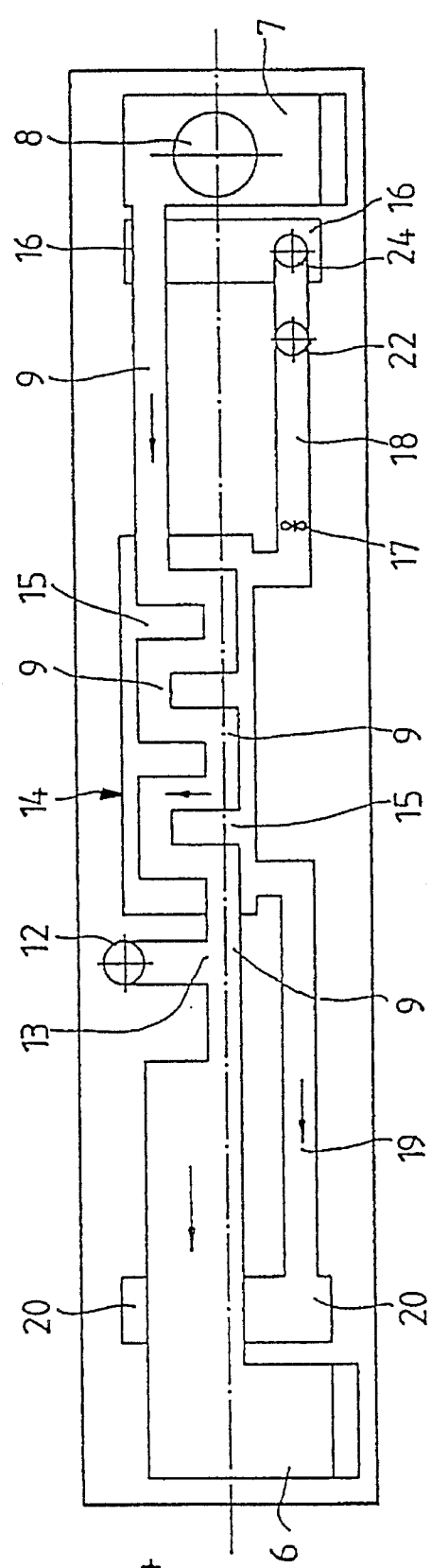

5,544,570

CONTINUOUS OVEN FOR MAKING BAKED WARE

BACKGROUND OF THE INVENTION

1. Field of the Invention

This invention relates to a continuous oven for making baked ware, comprising an elongate oven space provided with upper and lower radiant heaters, which are connected to be flown through in operation by heating gases, a revolving endless baking belt having a baking belt course for transporting the material to be baked through the oven space, and a heat exchanger for heating the air for the oven space, wherein the radiant heaters are connected to at least one heating gas circulating circuit, which is provided with an exhaust gas outlet, a fresh air inlet, and at least one heating gas generator.

2. Description of the Prior Art

In a traveling-hearth baking oven disclosed in Published German Application 1,532,904 the oven space is heated by heating gases, which are generated in a combustion chamber and are passed through the heating gas ducts, which are disposed above and below the oven space and consist of radiant heaters, and the gases are subsequently discharged as exhaust gases. The air for the oven space is sucked off and is replaced by preheated fresh air, which is initially preheated by the returning baking belt or in a heat exchanger, which is flown through by the air which has been sucked from the oven space, and the fresh air is subsequently passed through a recuperator, which is heated by the exhaust gases from the oven. Thereafter the fresh air is intermittently injected into the oven space. The fresh air may be heated up further in the combustion chamber in which the heating gases for the oven are generated. There is no circuit for circulating the heating gases.

EP 0 334 001 A1 discloses a continuous oven for making baked ware, which comprises two separate and separately controllable heating gas circuits for the upper heat and the lower heat, respectively. In that oven the burners for generating the respective heating gases are spaced apart along the oven space in the associated heating gas duct, which is disposed directly above and below the oven space, respectively. That continuous oven is provided with two water vapor exhaust ducts, which extend through the upper heating gas duct, and with water vapor-circulating means, which are disposed in the last one-third of the oven and serve to circulate water vapors transversely to the direction of travel of the baking belt. A supply of preheated air for the oven space has not been contemplated.

Swiss Patent Specification 356,100 discloses a travelling-hearth breadbaking oven that comprises an indirectly heated oven space and variable means for circulating air through the oven space along the latter. The oven space is heated by upper and lower heating gas ducts, which are flown through by heating gases. The air for the oven space is circulated along length sections of the oven space, which length sections differ in length by means of two fans and a duct system, which opens into the oven space through shut-off valves, which are distributed over the length of the oven space. A single circuit for circulating air for the oven space or two separate ones of such circuits, which are connected in series may be provided. The duct system comprises two ducts for supplying fresh air, which may be preheated. A supply of air which has been preheated by a heat exchanger to the oven space has not been contemplated.

SUMMARY OF THE INVENTION

It is an object of the invention to provide for making bakeware a continuous oven having a higher oven efficiency.

In a continuous oven which is of the kind described first hereinbefore this is accomplished in that the heat exchanger is connected to be flown through in operation by the air which is to be heated and is to be supplied to the oven space and is also connected to be flown through in operation by the heating gases which are being recycled to the heating gas generator of a heating gas circulating circuit, that a circuit for circulating air for the oven space is provided with a water vapor outlet and a fresh air inlet and communicates with the oven space and contains the heat exchanger between the fresh air inlet and the oven space, and that a heating gas circulating circuit includes the heat exchanger between the radiant heaters and the exhaust gas outlet.

Owing to the design in accordance with the invention the heating gases which are being recycled to the heating gas generator are cooled as far as possible before they reach the exhaust gas outlet so that the heating gases withdrawn through the exhaust gas outlet have the lowest temperature in the heating gas circulating circuit and the heat loss which is due to the withdrawal of heating gases will be minimized. At the same time the air which is intended for the oven space and is to be preheated is heated to the desired inlet temperature by the heating gases which are being recycled in the heating gas circulating circuit before said air enters the oven space.

BRIEF DESCRIPTION OF THE DRAWING

FIG. 2 is a schematic sectional view taken on line II—II in FIG. 1 on a larger scale.

FIG. 3 is a side elevation showing the continuous oven.

FIG. 4 is a schematic top plan view showing the continuous oven.

DETAILED DESCRIPTION OF THE PREFERRED EMBODIMENT

Figure 1:
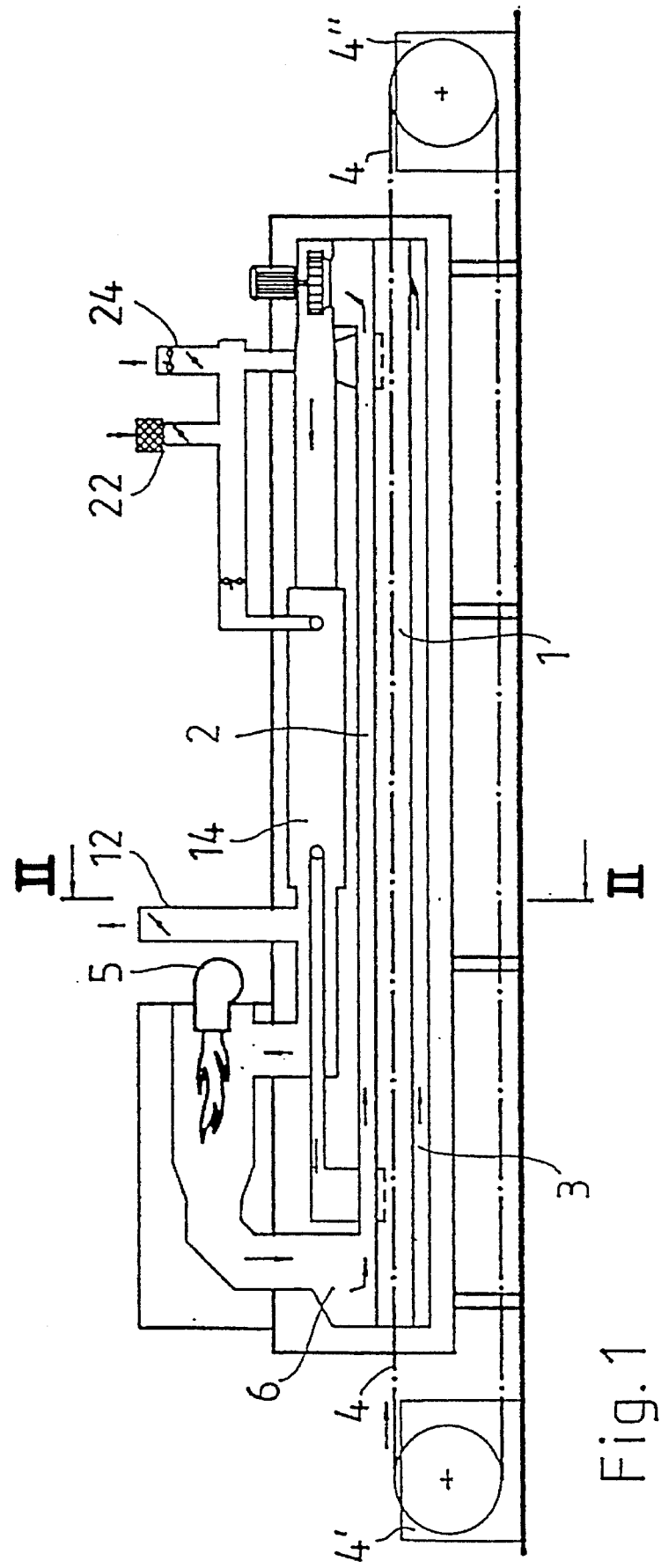
FIG. 1 is a schematic side elevation showing a continuous oven which embodies the invention.

An illustrative embodiment of the invention will be described more in detail hereinafter with reference to the drawing.

The continuous oven in accordance with the invention comprises an elongate oven space 1 and heating gas ducts 2, 3, which extend above and below the oven space 1, respectively, and constitute radiant heaters for emitting radiant heat into the oven space 1. The upper course of a revolving endless baking belt 4 extends through the oven space 1 and transports material to be baked through the oven space 1. That belt 4 is deflected in reversing stations 4', 4" disposed outside the enclosure surrounding the oven space and returns below said enclosure.

The heating gases are generated by a heating gas generator 5, which consists, e.g., of a gas or oil burner, and through a forward plenum chamber 6 that communicates with the heating gas ducts 2 and 3 are supplied to the inlet end of the heating gas ducts 2, 3. At their outlet end the heating gas ducts 2, 3 open into a rear plenum chamber 7, from which the heating gases are sucked by a fan and are then recycled in a recycle duct 9 to the burner 5. The burner 5 is supplied with the heating gases which have been recycled in the recycle duct 9 and with fresh air coming from a fresh air inlet 10. An exhaust gas outlet duct 12 provided with an controllable exhaust gas damper 11 branches from the recycle duct 9 before the burner 5. The recycle duct 9 extends through a heat exchanger 14, which precedes the junction 13 at which the exhaust gas outlet duct 12 is connected. In the heat exchanger 14 the heating gases being recycled deliver heat to the air which flows through the chamber 15 of the heat exchanger 14 before being supplied to the oven space. The upper and lower heating gas ducts 2 and 3 constitute radiant heaters and together with the forward plenum chamber 6, the rear plenum chamber 7 and the recycle duct 9 constitute a circuit for circulating the heating gases for the upper heat and the lower heat in the continuous oven. The super-atmospheric pressure which exists in the heating gas circulating circuit owing to the supply of fresh air to the burner 5 is relieved by the exhaust gas outlet duct 12 and by the natural draft in the chimney (not shown), which is connected to the outlet duct 12. As a result, the rate at which heating gas or exhaust gas escapes through the exhaust gas outlet duct 12 is exactly equal to the rate at which fresh air supplied through the fresh air inlet 10 is required for the combustion. The rate at which heating gas is circulated in the heating gas circulating circuit of the continuous oven will depend on the size of the continuous oven and on the nature of the product which is to be baked in a given case. In dependence on the size of the oven the heating gases are circulated at a rate in the range between 3000 m$^3$/h and 10,000 m$^3$/h. The heating gases are at a temperature in the range from 400° to 600° C. immediately after the burner 5 and at a temperature in the range from 300° to 400° C. in the rear plenum chamber 7.

Air is sucked from the oven space 1 by a fan 17 through a rear manifold 16, which directly precedes the rear plenum chamber 7 for heating gases. The fan 17 is disposed in a rear air duct 18, with leads from the rear manifold 16 to the heat exchanger 14. The air which has been sucked from the oven space 1 is forced by the fan 17 through the chamber 15 of the heat exchanger 14 and through a forward air duct 19, which extends from the forward end of the heat exchanger 14 and leads to a forward injecting chamber 20, which opens downwardly into the oven space 1. A fresh air supply duct 22 opens into the rear air duct 18 and is provided with a controllable fresh air damper 21 and has an outlet 23, which precedes the fan 17. A water vapor discharge duct 24 branches from the rear air duct 18 between the rear manifold 16 and the fresh air supply duct 22. The water vapor discharge duct 24 contains an exhaust damper 25 and a fan 26.

In dependence on the nature of the product to be baked and on the size of the oven, the fan 17 disposed in the rear air duct 18 blows air at a rate of up to 3000 m$^3$/h through the heat exchanger 14 into the oven space i and sucks off said air through the rear manifold 16. The air for the oven space is heated in the heat exchanger 14 to 250° to 300° C. In dependence on the nature of the product to be baked in a given case, 1 to 100% of the air which has been blown into and sucked from the oven space 1 are withdrawn through the water vapor discharge duct 24 and fresh air at a corresponding rate is supplied through the supply duct 22 to the rear air duct 18. The remaining air is recycled to the heat exchanger so that in dependence on the nature of the product up to 99% of the air for the oven space are recycled from the rear manifold 16 through the rear air duct 18, through the heat exchanger 14 and through the forward air duct 19 to the forward injecting chamber 20.

We claim:

1. An oven for baking edible baked goods, the oven defining an elongate baking chamber extending in a longitudinal direction and having opposite open ends, the baking chamber containing air, which oven comprises (a) two superposed radiant heaters extending in the longitudinal direction for heating the baking chamber, (b) a revolving endless conveyor belt having an upper course passing in the longitudinal direction between the radiant heaters for supporting the goods to be baked and transporting them through the baking chamber, and a lower course disposed outside the baking chamber, (c) a first recycling circuit through which the baking chamber air flows in a predetermined direction, the first recycling circuit including (1) the baking chamber and (2) a duct in communication therewith and succeeding the baking chamber in said direction, the duct comprising a manifold and a fresh air supply inlet succeeding the manifold in said direction, (d) a second recycling circuit through which heating gases flow in a predetermined direction, the second recycling circuit including (1) the radiant heaters and (2) a recycle duct in communication therewith and succeeding the radiant heaters in the direction of the heating gases flow, the recycle duct comprising an exhaust gas outlet and a burner generating the heating gases and receiving fresh air from a fresh air inlet, the burner succeeding the exhaust gas duct in the direction of the heating gases flow, and (e) a heat exchanger being arranged in the first recycling circuit duct between the fresh air supply inlet and the baking chamber, and in the recycle duct of the second recycling circuit between the radiant heaters and the exhaust gas outlet whereby the heating gases recycled from the radiant heaters to the burner pass through the heat exchanger and impart heat thereto while the baking chamber air recycled to the baking chamber is warmed by the heat exchanger.

\* \* \* \* \*